March 4, 1947.　　　　S. KRASNOW　　　　2,416,702
APPARATUS AND METHOD FOR RECORDING BOREHOLE RADIOACTIVITY
Filed Nov. 26, 1941　　　3 Sheets-Sheet 1

Inventor
Shelley Krasnow

March 4, 1947.　　　　S. KRASNOW　　　　2,416,702
APPARATUS AND METHOD FOR RECORDING BOREHOLE RADIOACTIVITY
Filed Nov. 26, 1941　　　3 Sheets-Sheet 2

March 4, 1947.  S. KRASNOW  2,416,702
APPARATUS AND METHOD FOR RECORDING BOREHOLE RADIOACTIVITY
Filed Nov. 26, 1941  3 Sheets-Sheet 3

Patented Mar. 4, 1947

2,416,702

UNITED STATES PATENT OFFICE 2,416,702

APPARATUS AND METHOD FOR RECORDING BOREHOLE RADIOACTIVITY

Shelley Krasnow, New York, N. Y., assignor to Geophysical Development Corporation, Washington, D. C., a corporation of Delaware Application November 26, 1941, Serial No. 420,584

11 Claims. (Cl. 250—83.6)

This invention relates to radioactive measuring apparatus, and has particular reference to radioactive apparatus for measuring radioactive intensity in boreholes and other inaccessible localities.

It is an object of the invention to provide convenient and reliable transmission means for transmitting the results of radioactive measurements made in inaccessible localities.

It is a further object of the invention to provide systems and methods for energizing or actuating radioactive measuring apparatus operating in boreholes and other inaccessible localities.

It is a further object of the invention to provide a system for energizing a radioactive measuring apparatus, and at the same time for transmitting signals therefrom.

The radioactive intensities encountered in geological work, and particularly boreholes, are often extremely feeble. The measuring apparatus must be correspondingly sensitive. A sensitive apparatus will intrinsically give a feeble response which response must be amplified in some way and transmitted in such fashion as to avoid spurious effects. The transmission of responses directly from the sensitive measuring element is generally extremely unreliable and in some cases impossible. With the use of long cables, as is often necessary in work in deep boreholes, the changing stretch of the cable, the effects of temperature thereon, the variable leakage of the cable, and the changing inductance and capacity, as the cable is unwound from its reel, all introduce disturbing factors which may distort or even mask the measurements obtained. Such factors have resulted in the obtaining of spurious and inaccurate results in the past, the interpretation of these results leading to errors in geological deductions made therefrom.

In the present invention, the teachings are extended to indicate methods and apparatus which may be used to avoid the introduction of any spurious responses. At the same time, convenient means for operating in deep boreholes where further problems are imposed by high temperatures are further dealt with. Although several alternative forms are described herein, it will be understood that the selection of the best mode of operation and of the selected apparatus will be obvious to those skilled in the art, and that after a consideration of these teachings, one so skilled will know which of the various methods here disclosed will serve a particular set of circumstances best. It will further be understood that various combinations may be made of the several systems disclosed.

In most of the various types of apparatus for measuring radioactivity in boreholes, some element requiring a high voltage for operation is generally used. Such elements were energized by means of batteries contained in a holder in close proximity to the sensitive element. While in many ways the use of such batteries simplified the apparatus, it introduced further difficulties. Thus, when operating these in boreholes, temperatures as high as 150° C. may be encountered. Ordinary batteries will not withstand this temperature. Furthermore, batteries are sometimes subject to erratic variation in their output voltage, and may be seriously affected by the jarring which takes place in any instrument lowered into a borehole. Moreover, a defective battery may be the cause of several unsuccessful runs. Still further, the frequent replacement and care of batteries is required, and the apparatus must be made correspondingly larger in order to hold the batteries.

In order to obviate the difficulties caused by batteries and similar sources of voltage mounted inside a cartridge, it has been found desirable to supply all, or at least part of the energy, used by that part of the radioactive system lowered into the borehole, and also by its related apparatus, from the surface of the earth. Thus, a generator or batteries may be utilized at the surface of the earth and the energy conducted down flexible conductors which also serve at the same time to suspend the apparatus.

Unless the apparatus is a recording type, that is one which marks a permanent record on a chart or the like contained within the cartridge, signals indicative of the radioactivity at various depths will be transmitted to the surface. These signals will usually be conveyed on electrical conductors, and these may be supplied additionally to the power conductors previously mentioned. However, in the interests of simplifying the apparatus and of making the cable less expensive and less intricate, the number of conductors may be reduced by using certain of the conductors to serve common functions. Thus, a multiconductor cable may be utilized serving to conduct energy to a cartridge lowered into the earth and to transmit responses indicative of the quantity being measured from the cartridge to the surface of the earth. In this cable, as shown herein, at least one of the conductors can serve in both the power supplying and signal conveying circuits simultaneously.

The use of conductors as mentioned above introduces other problems. Thus, the output responses of the measuring system will in general be of low energy, while the power fed into the apparatus will necessarily involve larger amounts of energy. It is therefore important that means be utilized to exclude the effects of the primary energy supply from affecting adversely the signal circuit. Means to perform this operation will also be shown herein.

Other problems are involved in the reliable transmission of signals. In general, it is often found that transmission over a long cable involves difficulties on account of its distributed resistance, inductance and capacity. These factors tend to attenuate or weaken signals which are transmitted therethrough. For this reason, large amounts of energy are considered as being helpful in the transmission of the signal.

If the signal is transmitted using solely the energy emanating from the apparatus contained within a cartridge lowered into the earth, it will be limited by the power output of the apparatus contained within the cartridge. On the other hand, if energy is supplied by means at the surface of the earth, where a large generator and relatively powerful apparatus may be utilized, the signal may be created by electrically connecting the terminals of certain of the conductors suspending the cartridge. The signal caused by the alternate closing and opening of these connections will be easier to detect than signals generated by apparatus within the cartridge.

It is further found desirable or necessary in the interests of stability that, where electrical apparatus for measuring radioactivity is utilized in a borehole and associated apparatus used at the surface of the earth, some common reference potential be adopted. The most convenient of such potentials is, of course, that of the earth, and it is considered best to provide that at least one terminal within the cartridge and a corresponding one in the apparatus at the surface of the earth be connected to earth. The adoption of this procedure will avoid the drift and the picking up of stray potentials which may occur if a common source of potential is not chosen. Furthermore, spurious effects introduced by capacity and by charges picked up on a long cable will be avoided.

Although such a reference potential is considered very desirable and in many cases quite necessary, the mere connection to earth between the apparatus immersed in liquid in the borehole and that at the surface of the ground is not considered adequate. Although such a connection may work in many cases, in general it is to be advised against. The contact between a cartridge immersed in fluid in a borehole is apt to be erratic, and unreliable. The passage through strata of different resistivity and through fluid of different resistivity as well as erratic contact resistance between the cartridge and the fluid in the borehole is apt to create spurious effects which may be misleading. For this reason, a lead connecting the grounded terminal contained within the cartridge with the grounded terminal of the apparatus at the surface of the ground is usually provided. Such a grounded lead may be made the common lead for both the power circuit, and the transmitting circuit transmitting the impulses from the radioactive measuring system.

In many cases, the use of vacuum tubes and gas discharge tubes associated with the radioactive measuring system will be particularly desirable, and circuits employing one or more of these tubes, all contained within a single holder associated with the radioactive measuring unit and lowered therewith, are provided. Ordinarily, vacuum tubes require a multitude of connections. They require a filament current, a plate voltage, and often the maintenance of definite grid voltages. Here again, the leads supplying the voltages to the vacuum tubes may be combined so as to serve common functions. Thus, a lead supplying filament current may also serve as one of the leads for supplying a plate current. Further still, one of the power supplying leads may be utilized as one of the conductors in the signal circuit, transmitting signals produced by the measuring system.

Reference is had to the accompanying drawings in which.

Figure 1:
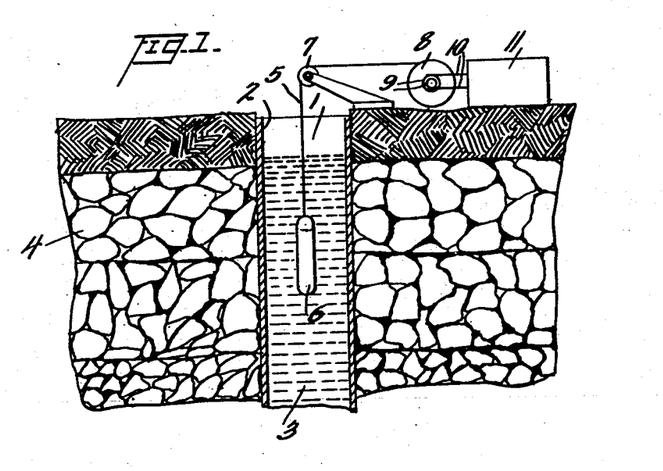
Figure 1 shows a cross-sectional view indicating the use of the apparatus to measure radioactivity in a borehole.

Referring now to Figure 1, I represents a borehole in the earth. This may or may not be lined with metallic casing 2, and may or may not be filled or partially filled with liquid 3. The borehole is drilled so as to intersect strata 4. Suspended in the borehole by a cable 5, is a cartridge 6, containing apparatus to measure the radioactivity produced within the borehole. A measuring wheel at the surface of the ground, represented as 7, serves to measure the length of cable that has passed thereover and also to guide the cable 5 in the borehole. The cable passes over to a drum 8, which serves to reel and unreel it, and electrical connection is made at all times to the cable 5 by means of slip-rings 9, upon which bear stationary brushes connected to wires 10. These lead to measuring apparatus represented schematically as 11, which may take any of the specific forms hereinafter described.

Figure 2:
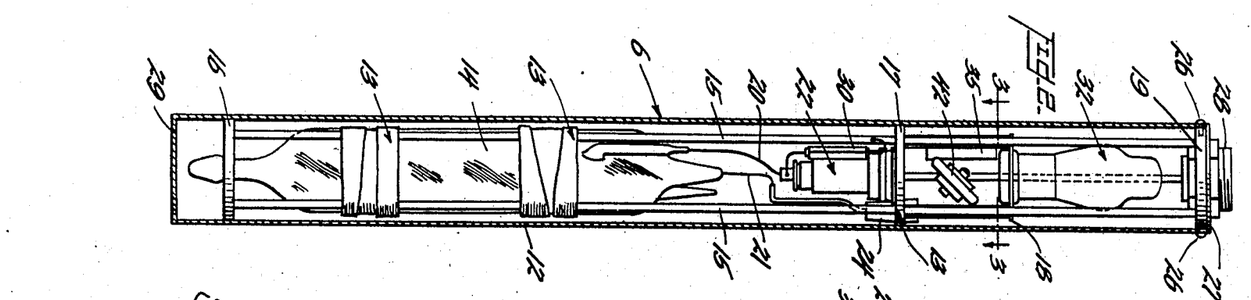
Figure 2 shows a vertical cross-sectional view of an element adapted to be lowered into a borehole to take measurements of radioactivity therein.
Figure 3:
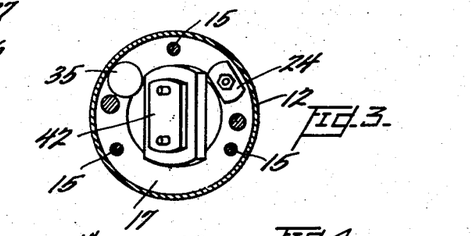
Figure 3 shows a transverse cross-sectional view of the apparatus shown in Figure 2, taken across the plane 3—3.

Referring now to Figure 2, 12 represents a cartridge or equivalent preferably pressure-tight container to house and protect the various measuring elements contained therein. This is preferably made of metal, but may be made of any material having suitable filtering properties, or having desired stopping power for rays emanating from radioactive materials. All of the housing or any portion thereof may be made of material having a limited absorbing power for rays emanating from radioactive or atomically disintegrating material. Where the apparatus is to be used in a liquid-filled borehole, it is understood that the outer casing 12, will be made tight enough, and the various connections thereof will be made leakproof so as to avoid injury due to the hydrostatic pressure developed in deep boreholes. Contained within the cartridge 12 is a framework 13. This serves to hold the various component parts of the apparatus in proper spaced relation to each other.

The framework 13 is made up by assembling a number of disks, preferably metallic, with a number of rods. This gives a framework which is strong compared to its weight, and which allows easy access to the various component parts of the apparatus mounted thereon. Various of the disks constituting the framework are made of such diameter as to fit closely within the tube 12. Thus, the entire assemblage can be slid in and out of the tube 12 and when mounted therein, fit so well that lateral rattling against the interior of the tube 12 is not possible. In practice, it is found desirable to make the disks a little smaller in diameter than the interior diameter of the tube 12, and to bend the rods 15 slightly. When these are inserted within the tube, the effect will be as though there were springs pressing laterally against the interior of the tube. This will serve to cushion any lateral blows which the tube may receive. At the lower ends of the framework held by flexible bands 13 is a Geiger-Muller counter tube 14. The flexible bands are attached to rods 15, 15, suspended from diaphragms 16, 17 and 18 spaced along the length of the rod. Because in many cases the Geiger-Muller tube is fragile, flexible bands are found very desirable for mounting. These bands act as cushioning elements to soften the blows which the apparatus may receive. At the lower end of the rod 15 is a stiffening ring 16, serving to hold the ends thereof. Near the upper portion of the rod 15, is another diaphragm 17, which serves to hold the rods in spaced relation and further to hold certain components of the apparatus in proper relation to each other. At the terminus of the rods 15 is a disk 19, which serves as the upper closure, as the holder of a junction box, and as means to stiffen the entire assembly. The leads 20 and 21 on the Geiger-Muller counter 14, are connected respectively to a grid of a vacuum tube 22, and to a condenser 23. The latter lead passes through an insulator having exceptionally good insulating properties and designated as 24. The lead 21 goes directly to the plate of vacuum tube 22. Between the grid of vacuum tube 22 and ground is placed a resistor 30, which may have a very high value and which serves as the quenching resistor. The terminal of the resistor 30 is grounded by being connected to the metallic rod 15. It is thus kept at the same potential as the framework 13 and tube 12.

The lead wires for conveying energy from the surface of the earth to the apparatus, and also for conveying impulses from the apparatus to the surface of the ground all terminate in a single receptacle 28, into which an electrical connecting plug may be inserted. The end of this plug is connected to the multi-conductor cable 25, which passes to the surface of the ground.

Screws 26 are fitted through holes in cartridge 12 into threaded holes in disks 19. Alternatively, the upper end of tube 12 may be threaded interiorly, disk 19 threaded correspondingly, and the two screwed together. A gasket may be placed between the upper part of tube 12 and the shoulder 27 of disk 19, to form a fluid-tight closure. It is understood that the attachment receptacle 28 is of such character as to be leakproof and to conduct the various leads of the apparatus where they may be engaged with connecting members of a corresponding plug. It is understood that the attachment plug fitted at the terminal end of the cable, adapted to engage with member 28, is also provided with a threaded connection so that the said cable may bear the entire weight of the apparatus contained within the cartridge 12 and thereby allow the raising and lowering of the apparatus by means of the cable. Such connectors, having a fluid-tight closure, and having sufficient strength to bear the weight of the assemblage are well known in the art and do not require further description here.

The tube 12 is closed at its bottom by a fluid-tight closure 29. The electrical assemblage of the apparatus elements in Figure 2 are represented in the upper part of Figure 4, the dashed line indicating the termination of the various elements in the attachment plug 28. Here it is seen that the outer cylinder 29 of the Geiger-Muller counter tube 14 is connected to ground through a high resistance 30. It is understood that the ground may represent any desired common reference potential adopted for the apparatus. A highly convenient and desirable reference potential is that of the framework 13 and tube 12. It is understood that when this is adopted, and the tube is lowered into a liquid filled borehole as shown in Figure 1, in effect connection will be made to the casing 2 and to the earth surrounding the casing by virtue of the conducting properties of the liquid. Even where work in a dry borehole is contemplated, this grounding is desirable, since the casing 12 may come into occasional contact with the walls of the borehole, and in any case may otherwise pick up spurious charges due to the moist air in the borehole, which as fairly good conducting properties when compared to the value of certain of the resistors used in the circuit shown in Figure 4. The tube 22 is represented as a pentode, but may be substituted by a tube having a different number of electrodes or by another equivalent element, the function of the tube being understood from the description herein. The grounded terminal of resistor 30 is connected to one of the leads 31. The filaments of tubes 22 and 32 are connected between the ground and a lead 33. They are thus in effect connected between terminals 31 and 33, since the former terminal is grounded. The bias on the grid of vacuum tube 22 is obtained through the arrangement made up of resistor 34 and condenser 35. Other well-known means may be utilized to obtain this bias. Grid 36 is connected directly to a terminal 37, and grid 38 is connected to the cathode 39 of vacuum tube 22. A plate circuit resistor 40 is provided and this leads to terminal 41. A condenser 42 leads from the plate of vacuum tube 22 to the grid of the vacuum tube 32. A resistor 43 is provided between one terminal of this condenser and ground. The cathode 44 of tube 32 is connected directly to a terminal 45, while the plate 46 of the same tube is connected to a terminal 47.

Figure 4:
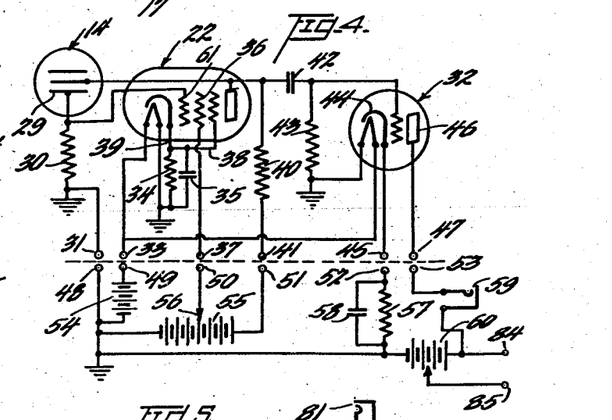
Figure 4 shows a wiring diagram, indicating the assembly of elements shown in Figure 2, together with the auxiliary apparatus used above ground.

In the interests of simplifying Figure 2, certain of the elements shown in Figure 4 have not been indicated. These are connected in conventional fashion, and their function and mode of attachment will be obvious from Figure 4.

All of the elements shown in Figure 4 above the dashed line are preferably included within the tube 12 and lowered as a unit into the borehole. However, it is understood that other elements may be incorporated within the tube 12 without losing the advantages of the instant invention.

Corresponding to terminals 31, 33, 37, 41, 45, and 47 are respectively terminals 48, 49, 50, 51, 52, and 53. Terminal 48, connected to grounded terminal 31 is connected to ground at the surface of the earth. Here again the ground preferably chosen is that of the earth itself near the borehole. The frame of the assemblage holding the various elements shown in the lower part of Figure 4 is preferably metallic and is preferably connected to the same terminal. Between terminals 48 and 49 is connected a battery 54 which serves to supply energy for the heaters of the vacuum tubes within the cartridge 12. There is also provided a battery 55 with an adjustable connection 56 to adjust the voltage of the grid 36. The same battery 55 is provided with a connection 51 which provides the high voltage for both the plate of tube 22 and for the operation of the Geiger-Muller counter 14. The other terminal of the battery 55 is grounded, and through connections 48 and 31 is connected to the grounded terminal of resistor 30. The value of battery 55 is chosen to be that proper for the operation of the particular Geiger-Muller tube employed. The exact voltage will depend upon the specific characteristics of the tube, and may lie in value anywhere between 500 and 2000 volts. The tube 22 will of course have to be one which will stand the voltage required. To bias the grid of tube 32, a resistor 57 and condenser 58 are provided, one terminal of these being connected to the cathode 44 of tube 32, the other terminal being connected to ground. The biasing arrangement may be dispensed with in its entirety and connection made between cathode 45 and ground directly. This will make it possible to connect terminal 45 to terminal 31 within the cartridge and eliminate terminal 52 altogether. Alternatively, other well-known means may be used for biasing. A connection outlet 59 and plate battery 60 are provided. The purpose of these will be hereinafter described. Although batteries 54, 55, and 60 have been shown, it is understood that these are merely symbolic of a source of steady direct current voltage. These voltages are as well supplied by an alternating current high voltage system as will hereinafter be shown. It will be understood that the battery 54 may be substituted by an alternating current source of equal voltage, since the tubes represented are those with indirectly heated cathodes. However, tubes having filamentary cathodes may be employed and in this case the substitute for battery 54 should be a direct current type.

In operation, whenever a discharge occurs in the Geiger-Muller tube 14, the potential on grid 61 is altered. This causes a correspondingly amplified pulse in the plate circuit of the tube 22, this amplified pulse being transmitted through condenser 42 to the grid of tube 32. The pulse is further amplified by this latter tube, and finally appears in greatly amplified form between the cathode 44 and plate 46 of tube 32, and consequently between the terminals of connection outlet 59. Aside from the other functions served by condenser 42, it will be observed that it excludes the high direct current voltage from the tube 32, and prevents this voltage from having effect thereon. The condenser 42 is so chosen in value as to transmit effectively a pulse of the frequency characteristics peculiar to the amplified pulse from the Geiger-Muller tube. Pulses of lower frequency characteristics are effectively excluded. It is understood that such pulses may be due to spurious causes or fluctuations within the apparatus. It will be understood further, that the condensers 35 and 58 also serve a filtering function particularly, where the batteries are shown in Figure 4 are replaced by a rectified alternating current source.

Figure 5:
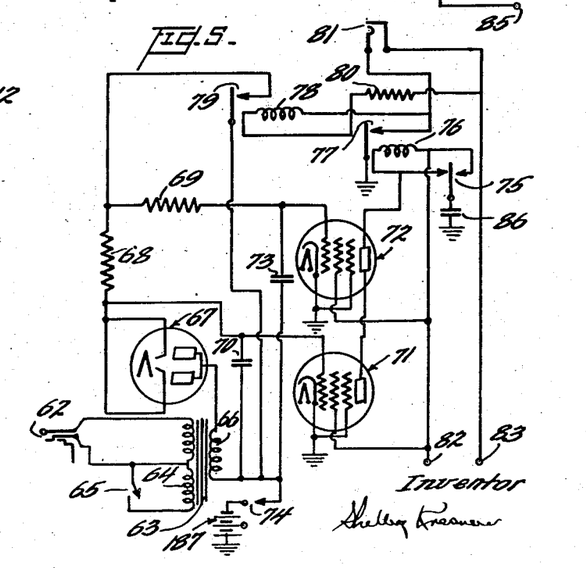
Figure 5 shows additional circuit elements to be used in conjunction with the apparatus shown in Figures 2, 3, and 4.

In order to register the impulses produced at the connection outlet 59, the circuit embodiment shown in Figure 5 may be provided. The connection plug 62 is provided with contacts engaging the contacts of connection outlet 59. These connections go to the primary of a transformer 63. Another winding 64 of this transformer has connected to it a short-circuiting switch 65. This transformer serves several functions. It serves to match the impedance of the circuits with which it is connected. It also serves to exclude direct current potentials due to the circuit embodiment shown in Figure 4, so that they will not affect the circuit elements shown in Figure 5.

The pulses produced in winding 66 by corresponding pulses from conection 62, pass into diode rectifier 67. The accumulated impulses rectified by the diode pass through resistors 68 and 69 and charge condenser 73. When condenser 73 is charged to a proper value, it produces an effect on tube 71 or 72, depending upon which one of the two tubes is being utilized. The present circuit is adapted to use either tube. Upon the actuation of the tube 71 or 72, the relay 76 is energized, closing contact 77. Simultaneously therewith, relay 78 is closed, closing contact 79 and short-circuiting condenser 73 through resistor 69. This effectively discharges the condenser, so that it is ready again for the receipt of accumulated impulses from the diode rectifier 67. Upon each closure of the relay contact 77, a relatively high amplitude pulse is produced at connection outlet 81. Any suitable counting mechanism may be provided at this outlet, a satisfactory one being a telephone counter of the type ordinarily used to record telephone messages. Among the functions served by the apparatus shown in Figure 5 is the important one of integrating the pulses. Thus, the condenser 73 will continue to receive pulses until its charge is built up to a definite predetermined voltage, at which voltage it will actuate the connected tube, either 71 or 72. By properly proportioning the resistor 69 and the condenser 73, the circuit may be made to count any desired number of initial pulses before the production of any output pulse at the jack 81. Another important function served by the apparatus is to give a large output pulse, one with considerable power and capable of operating a counter requiring high energy. It is further understood, that each pulse may be amplified and may be made apparent at jack 81, where it will actuate a counter requiring high energy.

The switches 74 and 75 are intended merely to select which of the tubes 71 or 72 is to be used.

Connections 82 and 83 go to the corresponding connections 84 and 85 shown in Figure 4.

The switch 65, by short-circuiting the winding 64 of the transformer prevents any energy from passing from the primary to the secondary of this transformer. It may thus be utilized to prevent the pulses from reaching the circuit associated with winding 66 of the transformer. This is desirable where the pulses are counted in connection with some timing mechanism, or if it is desired to initiate the counting at a definite time zero. Thus, if one were using a stop watch or the like, he would hold switch 65 in closed position, and would open it simultaneously with the release of the counting hand of the stop watch.

Figure 6:
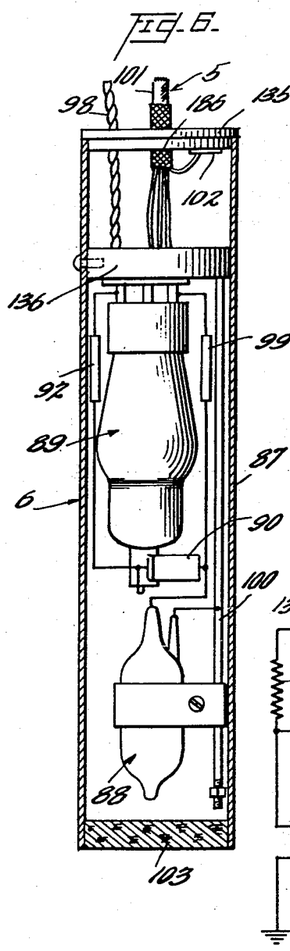
Figure 6 shows a vertical cross-sectional view of an alternative apparatus adapted to be lowered into a borehole to measure radioactivity.
Figure 7:
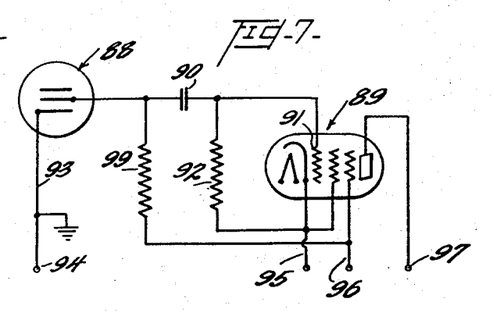
Figure 7 shows the wiring diagram of the circuit elements disclosed in Figure 6.

Referring now to Figure 6, 87 represents a tube which may be made of steel, copper, or other metallic or non-metallic material, having suitable radioactive ray filtering properties and suitable strength characteristics. This tube may also serve to keep out light rays and other rays having a possible disturbing effect upon the apparatus. It serves a further function of acting as an electrostatic shield to avoid spurious effects, and provides a structure which may be maintained at a definite potential. Into one end of this tube is fitted a removable plug 103, which may be made of material having different filtering properties than that of the tube 87. Thus, by changing the plug 103, or by removing it altogether where conditions permit, the characteristics of the system may be altered. Plug 103 may be made for instance of cork, wood, plastic, and may thus permit the measurement of rays whether radioactive or otherwise, capable of penetrating such material. A disk 135 serves to constitute the closure for the upper end of the tube 87, and also to hold the various elements and the cable thereof in proper spaced relationship. Spaced from the upper head 135, is a disk-like member 136, serving to hold a vacuum tube and further to support a rod 100. The latter rod has connected to it at its terminal portion, both mechanically and electrically, one of the electrodes of a Geiger-Muller counter tube 88. Since the rod 100 is connected to the frame as shown, it is obvious that it acts as a ground connection for the Geiger-Muller tube. The Geiger-Muller tube has been so thoroughly described that no discussion of its details is believed necessary here. To the central wire of the counter tube is attached a high resistance 99, which is also connected to a grid of the vacuum tube 89. A condenser 90 of small capacity is connected to one terminal of this resistor, and to a grid 91 of vacuum tube 89. A resistor 92, of high value, and preferably of the same order of magnitude as resistor 99 is connected to the cathode and grid of the vacuum tube 89. The filament of tube 89 may be provided with current by an additional pair of leads 98, which are combined with the leads previously mentioned and brought to the surface of the earth. The cylinder 87 and rod 100 are also thus conductively connected to terminal 94. The cable 101, leading to the apparatus has an outer shield of metallic material. This shield 186, and one of the leads of the cable are both connected to the frame of the apparatus at 102. Although the leads 98 and 101 are shown as being separate, they may be combined by adding further conductors to the cable. The cathode, grid, and plate of the tube 89 terminate respectively in contacts 95, 96, and 97, which are connected to the cable 101 leading to the surface of the earth. All of the apparatus shown in Figure 6 is incorporated in the cartridge 87 and lowered below the surface of the earth. Connection is made through the cable 101 to the terminal shown in Figure 7. The connections are made as follows:

Terminal 136 is connected to terminal 94, terminal 105 to 95, 106 to 96, 104 to 97.

Figure 8:
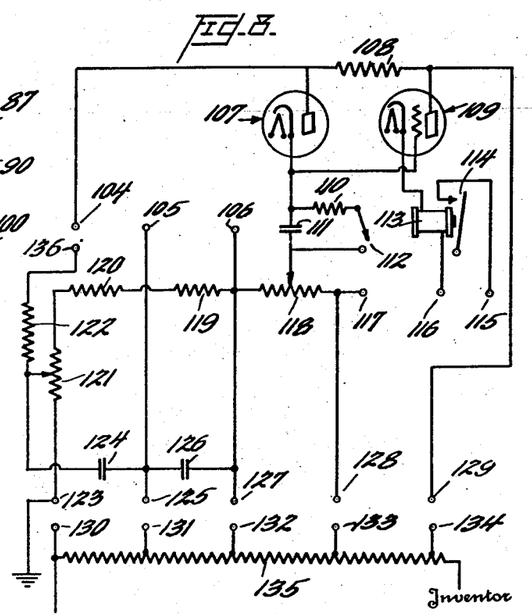
Figure 8 shows a auxiliary apparatus used above ground in conjunction with the apparatus shown in Figures 6 and 7.
Figure 9:
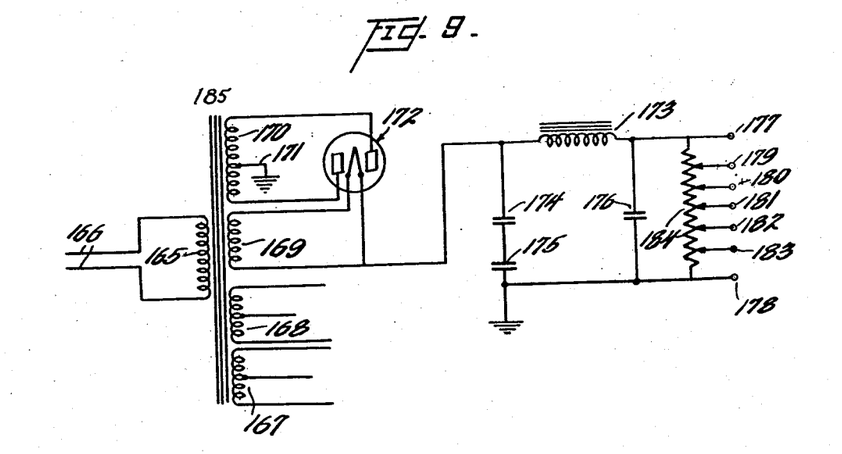
Figure 9 shows a means of obtaining energy for the various modifications shown herein.

At the surface of the earth, the apparatus shown in Figure 8 is provided. This has a resistor 122 connected to the grounded terminal, and connected to the movable arm of a potentiometer 121. A diode rectifier 107 is provided to rectify the amplified impulses originating from the Geiger-Muller counter tube 88, and amplified by the vacuum tube 89. The sum of these pulses will be related to a certain rate of production of pulses or a certain total number of pulses produced by the Geiger-Muller counter tube 88. The control 121 acts as a sensitivity control, while the control 118 acts as an extinction point control for operation of the relay. The terminals 123, 125, 127, 128, and 129 go to the source of the power. This may be a number of batteries connected in series, or may be the output of a suitable direct current voltage supply. A preferred way of obtaining these voltages is indicated in Figure 9 herein.

In operation, when a pulse is derived from the Geiger-Muller tube, it is quenched by the resistor 99. The pulse thus produced passes through the condenser 90, and is impressed across the grid of vacuum tube 89. The change in grid voltage causes a different flow of current between the cathode and plate of the vacuum tube 89. This is impressed across the diode rectifier 107 and is utilized to charge the condenser 111. When this condenser is charged to a certain amount, its voltage will rise to an amount sufficient to cause actuation of the relay 113. If a voltmeter is connected across terminals 116 and 117, the voltage rise across condenser 111 can be observed. The rise of value on this voltmeter will therefore be indicative of the frequency of the pulses produced by the Geiger-Muller tube. The voltmeter may be omitted and a resistance of suitable value substituted therefore. When the relay 113 operates, it can be made to work a switch 114. The switch 112 may be operated manually to discharge the condenser and to bring the circuit back to its original condition. Such a switch may also be operated automatically by relay 113. The resistor 122 is intended chiefly as a protective resistor, and may be omitted entirely without affecting the operation of the apparatus. Terminal 123 is grounded, preferably at a point in the earth near the site of measurement.

Suitable values for the apparatus elements shown in certain of the modifications are as follows:

14—6J7
30—$10^9$ ohms
32—Type 37
34—5 meg.
35—.1 mfd.
40—2 meg.
42—.002 mfd.
43—1 meg.
54—6 volts
55—650 volts
60—135 volts
67—6H6
68—5 meg.
69—1000 ohms
70—.01 mfd.
71—Type 41
72—6J7
73—1.0 mfd.
89—6C6
90—.00003 mfd.
92—$1.5 \times 10^9$ ohms
99—$1.5 \times 10^9$ ohms
107—6H6
108—½ meg.
109—6C5
110—2 meg.
111—20 mfd.
118—10,000 ohms 119—50,000 ohms
120—250,000 ohms
121—100,000 ohms
122—100,000 ohms
124—.1 mfd.
126—.25 mfd.
130-131—315 volts
131-132—90 volts
132-133—45 volts
133-134—180 volts
166—110 v.-60 C. P. S.
172—Type 83
174—16 mfd.
175—16 mfd.
176—2 mfd.
184—25,000 ohms The proper values and characteristics of the other elements will be apparent to those skilled in the art from the description of their functions herein. The above values are by no means limiting, and are given as representing values which have given satisfactory performance. Changes may be made in these values by those skilled in the art without departing from the scope and spirit of the invention.

It is seen that in the various modifications certain of the leads serve common purposes. Thus, the grounded lead 31, shown in Figure 4, serves for the transmission of the signals, for the maintenance of the portions of the apparatus below ground and those above ground at a common potential, and for one of the power leads. Similarly, it should be noted that lead 41 supplies the plate current to tube 22. At the same time, it will be realized that a feeble, though an identifiable signal due to operation of the Geiger Muller tube may be obtained between points 51 and the battery 55, or between battery 55 and ground. Furthermore, lead 47 supplies the plate energy to tube 32. It also serves to transmit the final amplified signal, and to place it across the contacts of the jack 59. When cathode 45 is grounded, instead of being biased through condenser 58 and resistor 57, it will be seen that the final signal will be received between ground directly, and the plate circuit of plate 46 of tube 32. Here again in regard to tube 32, the grounded lead will serve as a common terminal for the transmission of the signal from this tube, and also for the transmission of power to the tube.

Similar considerations apply to the embodiment shown in Figures 6, 7, and 8. Here the lead 84 is grounded, and is connected to lead 135 which is also grounded at the surface of the earth. This lead also serves as one of the power conductors, being connected through potentiometer 121 to the terminal 123 which leads to the power source. Similarly, lead 87 serves to supply plate energy for tube 89, and also to receive the signal from this tube. As has been mentioned previously, cable 101 is provided with an exterior metallic shield, which is connected to the grounded terminal 102 of the apparatus in cartridge 87, and is also connected to the grounded terminal 135 of the apparatus at the surface of the ground.

It is seen that the final output of the apparatus shown in Figures 6, 7, and 8 is indicated upon a meter which may be a voltmeter and which may be a recording type. This meter may either record against time, or against position of the apparatus within the borehole. It is seen further that a relay is provided, this being capable of giving a rather large output pulse upon the closure of its contacts. This output may be fed to a chronograph. Similarly, the apparatus in Figures 2, 3, 4, and 5, gives as the final result a large integrated output pulse, which is applied across the contact of jack 81. This may also be applied across a recording chronograph.

Figure 9 shows a source of energy which may be applied to operate the apparatus shown in Figures 2, 3, 4, and 5, and also to operate the apparatus shown in Figures 6, 7, and 8. This is intended to operate from a suitable alternating current supply, which may be at 110 volts and 60 cycles. The principles, however, are applicable to alternating currents of lower or higher frequencies. 165 is the primary of a high voltage transformer supplied from alternating current supply terminals 166. The transformer may have several secondary windings, such as 167, 168, 169, and 170. All of the secondary windings save that designated as 170 may be relatively low voltage windings, suitable for instance for heating the cathodes of vacuum tubes. At the central part of winding 170 may be placed a grounded connection 171. The two terminals of the windings are connected to the plates of a rectifier tube 172. The heater of tube 172 is connected to winding 169. In order to filter the ripple remaining, due to the original supply frequency, a filter made up of choke 173, condensers 174 and 175 together with condenser 176 may be utilized. The high voltage, properly filtered, will appear between terminals 177 and 178. Various adjustable taps such as 179, 180, 181, 182, and 183 may be placed across a resistor 184, so that different voltages will be available. Thus, in Figure 8, the resistor 135 may be replaced by resistor 184, and corresponding connections made to terminals 178, 183, 182, 181, and 180. In this way, the various voltages required for operation of the apparatus shown in Figures 6, 7, and 8 may be obtained from a winding such as 170 of the transformer. Thus, the alternating current may be utilized as energy for one part of the apparatus, while the direct current obtained from the same original source is utilized for the remainder of the apparatus.

Similarly, in Figure 4, it will be noted that one terminal of each of the batteries shown therein is connected to a common point which is grounded. Thus, these batteries may be substituted by the supply terminals shown in Figure 9, batteries 54, 55, and 60 being replaced by terminals 178, 183, 182, 181, 180, and 179. The one battery shown in Figure 4, since its terminal is also grounded, may be substituted by the use of an additional contact on resistor 184. Thus, all of the voltages required for operation of this apparatus may be obtained initially from a single source of alternating current, and after being properly rectified and filtered, the various voltages obtainable may be applied each to serve a different function in the apparatus.

It may be noted further that instead of using the battery 54, one of the windings such as 168 on transformer 185 may be utilized, the remaining voltages being supplied from the terminals on resistor 184 as hereinabove described. The use of an alternating current directly in this capacity is possible partly because of the filtering action of condenser 42. This condenser, because of its relatively low capacity, will fail to pass the frequency utilized for the original supply current, but will pass the relatively sharp pulse produced by the Geiger-Muller counter 14 and amplified by the tube 22. For the same reason, a small amount of residual alternating current of the supply frequency in other leads will fail to pass condenser 42, and thus be effectively excluded from the amplifying tube 32.

Similarly, returning to Figure 7, the condenser 90 will fail to transmit the supply frequency, but will transmit the relatively high frequency to which the pulse due to the Geiger-Muller tube is equivalent. It should be noted that in Figure 8, condensers 124 and 126 also serve a filtering function.

The heat produced by the heater or filament of tubes 22, 32, 89, or 141 serves a useful function in the apparatus. In all forms shown, it is understood that in certain portions of the circuit, exceptionally good insulation is required. This applies with particular emphasis to the insulation of the leads coming from the Geiger Muller counter tube itself. A small amount of leakage, or erratic leakage may simulate the action of the tube, and thus give spurious results. If the apparatus is assembled at room temperature, when it is lowered into the borehole and the filaments are operating, the temperature within the cartridge will be higher than room temperature, provided radiation from the outside of the cartridge 12, for instance is not too great. This will avoid the condensation of moisture which may occur on certain of the parts if the temperature falls well below that at which the apparatus was assembled.

In this connection, the disks 16, 17, 18, in Figure 2 serve another important function. They act as baffles to prevent the excessive movement of convection currents of gas within the cartridge 12, due to the heating effect of tubes 22 and 32. Such convection currents might create and transport static charges in various parts of the apparatus, giving rise to spurious effects.

All forms of the apparatus shown will respond to gamma rays from either strongly or weakly radioactive sources. They will, without modification, respond to extremely penetrating rays such as cosmic rays, and to the secondary effects produced by primary cosmic rays.

The counter tubes or the equivalents substituted therefor as mentioned below will respond to other rays given off by radioactive substances and by substances undergoing atomic disintegration. Thus, a neutron, for example, as well as other electromagnetic and particle rays given off by disintegrating substances or excited atoms will affect the counter or its substitute, and will be measured and recorded as taught herein.

If it is desired to make the apparatus respond to very soft radiations, or alpha or beta rays, the modification shown in Figure 6 will be particularly useful. Here the insert 103 may be made of material having limited absorbing power for rays. This will permit the entrance of such rays to the sensitive element 88, which will respond thereto. The closure 103 may be omitted entirely. At the same time, the apparatus will be protected by the strong shell 87 and shielded against electrical disturbances. It may be lowered into liquid in this condition, the air trapped within the housing 87 preventing the entrance of liquid for moderate depths.

Although a Geiger-Muller counter tube has been shown in the various modifications indicated herein, it is understood that any suitable element responsive to radioactivity or a similar quantity may be utilized in accordance with the principles of the invention. In particular, any device using an electrical source of energy and giving an output response which is proportional for the radioactivity in the vicinity may be considered the equivalent of a Geiger-Muller counter tube and may be substituted therefor without departing from the spirit of the invention. It is understood that an ionization chamber may be substituted for the Geiger-Muller counter, and energized in fundamentally the same way as indicated herein, and that the auxiliary elements intended to operate with the chamber may also be energized in similar fashion.

The scope of the invention is indicated by the appended claims.

I claim:

1. In an apparatus for the measurement of radioactivity within a deep narrow borehole, an assemblage containing an element sensitive to radioactivity, and an auxiliary amplifying tube operated thereby, the said tube and said element requiring a multiplicity of diverse voltages for operation the said assemblage having narrow lateral dimensions and lowerable below the surface of the ground, a cable having conductors serving to connect the assemblage to apparatus at the surface of the earth, and energizing means at the surface of the earth, the said means providing through the intermediacy of the cable all of the multiplicity of diverse voltages and all of the electrical energy required for operation of the assemblage below ground, the output of the said amplifying tube being transmitted through the same cable, at least one of the conductors thereof serving a plural power conveying and signalling function.

2. In an apparatus for the measurement of radioactivity within a deep narrow borehole, an assemblage adapted to be lowered into a borehole in proximity to a point where the radioactivity is to be measured, the said assemblage having components requiring a plurality of operating voltages said components including an element sensitive to radioactivity, and an auxiliary element responsive to the first-named element and serving to transmit the responses therefrom to the surface of the earth at least some of said components requiring direct current for operation thereof, a source of energy at the surface of the earth, the said source employing an alternating current, means to utilize the alternating current so as to produce the said plurality of voltages for the components of the assemblage within the borehole means to rectify at least some of the voltages required, so as to provide direct current for the components requiring direct current, the said source of energy supplying all of the electrical energy required for operation of the radioactive assemblage within the borehole and for transmission of responses thereof to the surface of the earth, the conductors conducting the energy to the assemblage within the borehole, also serving at least in part the additional function of conveying signals therefrom.

3. In an apparatus for the measurement of radioactivity within a deep narrow borehole, an assemblage of narrow lateral dimensions having elements adapted to be lowered into a borehole, and to transmit responses indicative of radioactivity therefrom, an alternating current supply source, supplying energy to be fed into the assemblage within the borehole so as to provide the energy required for operation of all the elements therein, a sensitive system mounted upon the assemblage and being adapted to give an output response having frequency characteristics peculiar to the said sensitive system and different from the primary energy source of alternating current, means to amplify selectively the output response so as to accentuate the frequency characteristics peculiar to the sensitive system thereby permitting the discrimination between the said response and the effect of stray current produced by the said energy source, and means at the surface of the earth receiving and indicating the responses after said discrimination.

4. In a method for the measurement of radioactivity within a deep narrow borehole, the steps of utilizing an alternating current supply voltage at the surface of the earth, of rectifying and filtering the said supply voltage, of providing from the same source of diversity of voltages, each suitable in character for the different components of a radioactivity measuring system the said radioactivity measuring system being lowered within a deep narrow borehole, of applying the voltages to the said system, of receiving a signal from the radioactivity measuring system due to radioactivity and due to the applied electrical energy the said radioactivity measuring system having means to create a signal having different frequency characteristics from those of the original alternating current supply voltage, of discriminating between the signal and the supply frequency, of recording the signal thereby obtaining a final response free of spurious effects due to the original supply current.

5. In an apparatus for the measurement of radioactivity within a deep narrow borehole, an assemblage adapted to be lowered into a borehole, the said assemblage including an element sensitive to radioactivity and utilizing elements maintained at high voltage between which ionization occurs, auxiliary means requiring electrical energization connected in a signal circuit and adapted to transmit the responses from the said element to the surface of the earth, conductors leading from the surface of the earth to the said assemblage in a supply circuit to suppy the assemblage with all the energy required for operation and to transmit signals from the assemblage to the surface of the earth, a common conductor serving as one of the conductors in the signal circuit and additionally as one of the conductors in the supply circuit, the said conductor being connected to the said assemblage to maintain the assemblage at a reference potential established at the surface of the earth, one of the elements of the sensitive member being connected directly to the said common conductor.

6. In an apparatus for the measurement of radioactivity within a deep narrow borehole, a holder adapted to be lowered within the earth to various depths therein to localities where it is desired to measure radioactivity, the said holder being in the form of an electrically conducting enclosure having within it an element sensitive to radioactivity, and auxiliary apparatus to operate from the responses from the said element, a cable extending within the said holder, and connected to the sensitive element and auxiliary apparatus, the said cable having an outer conducting shield connected to the conducting holder, and additionally connected to elements contained within the enclosure, the said cable extending to the surface of the earth, and having there connected to it an energy source to supply energy for operating apparatus within the holder, and having additionally connected thereto means to receive and record the responses transmitted up the cable by the elements within the holder, at least one conductor within the said cable in addition to the said outside shield serving at least in part the dual function of transmitting energy down to the apparatus within the holder, and transmitting the signals upward for reception and detection.

7. In a method of making measurements of radioactivity within a deep narrow borehole, the steps of establishing a plurality of electrically conducting paths between the surface of the earth and a location proximate to the locality at which measurements of radioactivity are desired within the borehole, of transmitting through the said electrical conducting paths electrical energy of selected electrical frequency characteristics, of receiving said energy at the selected locality within the borehole, and utilizing said energy to create a signal whose character is indicative of the intensity of radioactivity within the said borehole and whose electrical frequency characteristics are electrically distinguishable from that of the said electrical energy, of amplifying the said signal, of transmitting the said signal up at least some of the said conducting paths, to the surface of the earth, of receiving the said signal at the surface of the earth distinguishing electrically between the signal and said transmitted electrical energy by virute of their respective electrical frequency characteristics, and recording the said signal in correlation with the depth at which the indication of radioactivity was obtained.

8. A method as in claim 7 in which the electrical energy is supplied in the form of direct current, and the signal is in the form of a series of pulses.

9. A method as in claim 7, in which the earth is placed in electrical parallel connection with one of the said conducting paths.

10. In a method of making measurements of radioactivity within a deep narrow borehole, the steps of utilizing an alternating current energy supply, of rectifying said alternating current to produce a direct current, of utilizing the said direct current to actuate an element sensitive to radioactivity, and placed proximate to a point within the borehole at which the measurement of radioactivity is desired, to create at the said locality within the borehole, a signal indicative of the radioactivity there, and having frequency characteristics different from that of the original alternating current supply source, whereby the signal will be easily distinguishable over any stray and residual unfiltered components of the original alternating current supply, of transmitting the said signal to the surface of the earth, of utilizing the said different characteristics of the signal to cause separation between the said signal and the disturbance due to the original energy supply, and of recording the said signal after separation in correlation with the depth at which the measurement was made.

11. In a method of making measurements of radioactivity within a deep narrow borehole, the steps of establishing a plurality of electrically conducting paths between the surface of the earth and a locality within the borehole at which it is desired to measure radioactivity, of transmitting from a source at the surface of the earth to at least some of the said plurality of paths, electrical energy, of conveying the said electrical energy down the said conducting paths to the said locality within the borehole, of creating within the said borehole at the said desired locality an electrical signal indicative of the radioactivity at the said locality, and having electrical characteristics peculiar thereto, of amplifying said signal selectively to accentuate the said electrical characteristics relative to electrical characteristics not related to the said signal, of transmitting the said signals upward along at least some of the electrically conducting paths, in contrary direction to the energy being supplied at the surface of the earth, the energy for transmitting the signals up the cable being derived solely from that transmitted to the cable at the surface of the earth, of receiving the said signals at the surface of the earth, of again accentuating at the surface of the earth the said electrical characteristics peculiar to the said signal relative to electrical characteristics not related to the said signal and recording the said signal at the surface of the earth in correlation with the depth at which the measurement is made.

SHELLEY KRASNOW.

REFERENCES CITED

The following references are of record in the file of this patent:

UNITED STATES PATENTS

| Number | Name | Date |
| --- | --- | --- |
| 2,018,080 | Martienssen | Oct. 22, 1935 |
| 2,133,776 | Bender | Oct. 18, 1938 |
| 2,219,273 | Scherbatskoy | Oct. 22, 1940 |
| 2,197,453 | Hassler | Apr. 16, 1940 |
| 2,349,225 | Scherbatskoy | May 16, 1944 |
| 2,368,532 | Fearon | Jan. 30, 1945 |
| 2,369,550 | Frosch | Feb. 13, 1945 |